(12) United States Patent
Pahls et al.

(10) Patent No.: US 10,909,564 B2
(45) Date of Patent: Feb. 2, 2021

(54) FAST AND VERSATILE GRAPHICAL SCORING DEVICE AND METHOD

(75) Inventors: Avery Colorado Pahls, Beverly Hills, CA (US); Alexis Nepomuceno, Olympia, WA (US); Ben Maxstadt, Coeymans Hollow, NY (US)

(73) Assignee: PicScore, Inc., Los Angeles, CA (US)

( * ) Notice: Subject to any disclaimer, the term of this patent is extended or adjusted under 35 U.S.C. 154(b) by 2261 days.

(21) Appl. No.: 13/297,041

(22) Filed: Nov. 15, 2011

(65) Prior Publication Data
US 2012/0123828 A1 May 17, 2012

Related U.S. Application Data

(60) Provisional application No. 61/414,514, filed on Nov. 17, 2010.

(51) Int. Cl.
*G06Q 30/02* (2012.01)

(52) U.S. Cl.
CPC ..... *G06Q 30/0218* (2013.01); *G06Q 30/0269* (2013.01)

(58) Field of Classification Search
None
See application file for complete search history.

(56) References Cited

U.S. PATENT DOCUMENTS

| | | | | | |
|---|---|---|---|---|---|
| 2003/0191682 | A1* | 10/2003 | Shepard | ......... | G06Q 30/02 705/7.32 |
| 2003/0236834 | A1* | 12/2003 | Gottfried | ......... | G06Q 50/01 709/204 |
| 2009/0316961 | A1* | 12/2009 | Gomez Suarez | ...... | G06K 9/033 382/118 |

OTHER PUBLICATIONS

Emanuele Feronato, "Click image and get coordinates with Javascript", http://www.emanueleferonato.com/2006/09/02/click-image-and-get-coordinates-with-javascript/, Sep. 2, 2006, pp. 1-4.*
Coolmoondog and Skaffman, http://stackoverflow.com/questions/1728897/div-background-image-and-image-map; May 16, 2010, pp. 1-2.*
Lori Eldridge, "How to Add Frames Around Images with CSS", https://web.archive.org/web/20080117090856/http://www.loriswebs.com/html-tips/frame-images.html, Jan. 2008, pp. 1-5.*
Emanuele Feronato, "Click image and get coordinates with Javascript", http://www.emanueleferonato.com/2006/09/02/click-image-and-get-coordinates-with-javascript/, Sep. 2, 2006, pp. 1-4 (Year: 2006).*
Coolmoondog and Skaffman, http://stackoverflow.com/questions/1728897/div-background-image-and-image-map; May 16, 2010, pp. 1-2 (Year: 2010).*

* cited by examiner

*Primary Examiner* — John Van Bramer

(57) ABSTRACT

A graphical user interface presents an image to a user and two labeled axes of that image corresponding to evaluations by the user of the image or of something represented by the image. The user moves a computer mouse or other input device to select a single location on the image. The display screen provides immediate feedback to the user of the location currently being pointed to by the input device, such as the x and y coordinates currently being moused over. The user then selects the location on the screen being pointed to, thus inputting his two dimensional evaluation. Optionally, based on the user's multidimensional evaluation, commercial offers such as coupons can then be presented to the user based on the user's likes and dislikes.

6 Claims, 4 Drawing Sheets

US 10,909,564 B2

FAST AND VERSATILE GRAPHICAL SCORING DEVICE AND METHOD

CROSS-REFERENCE TO RELATED APPLICATIONS

This application claims priority from U.S. provisional patent application No. 61/414,514 filed Nov. 17, 2010, the entire contents of which are hereby incorporated by reference as if set forth herein.

BACKGROUND OF THE INVENTION

1. Field of the Invention

This invention relates to the field of obtaining feedback from individuals. More particularly, this invention relates to a fast and versatile method of obtaining polling information from individuals, and a device for doing so that is particularly well suited for implementation using the Internet, smart phones, and other interactive devices.

2. Description of Related Art

Obtaining feedback and scoring from users, who can be customers or simply general members of the public, is useful in a wide variety of applications. Feedback and scoring mechanisms are becoming more and more popular over the Internet. A news website might ask readers on its home page to click a radio button and thereby cast a straw vote for one candidate on a slate of candidates. Another website asks readers to state their opinions on current topics of interest and/or debate, e.g., "Would you object to a full-body scan or pat down at airport security? o Yes o No." That question allows users to input only what constitutes a binary score, i.e., "yes" or "no." Another more sophisticated website and polling system allows users to rate college professors by giving the professor a score of 1-5 in each of various different categories including "easiness," "helpfulness," and "clarity." Consumer feedback information including consumer ratings can be extremely valuable marketing information, and hence companies have been placing increasing efforts into obtaining consumer feedback including ratings of its products or services in a number of different categories.

SUMMARY OF THE INVENTION

The present invention is of a method and associated device which may be implemented over a computer network such as the Internet or other interactive devices, that provides a fast, interactive, easy, and fun to use interface for people to provide ratings, i.e., scores. By providing a fast, intuitive, and fun-to-use interface, the present invention makes websites at which people can score products, services, people, etc., more attractive to Internet users and hence helps to generate website traffic and also helps the website operator to gather information about people's likes and dislikes for marketing purposes. Additionally, by allowing the website operator to gather multidimensional information about the user's likes and dislikes or other reactions, the website operator can then offer on behalf of advertisers targeted deals that can be, for example, in the form of coupons to the user. The coupons can be single dimension coupons such as 10% off of a particular product, or can be a package deal such as 2-for-one entrance to a particular theme park plus 20% off at a particular restaurant within that theme park. The coupons can be free coupons given to the user, or they can be sold to the user. Revenue can thus be derived either from the advertiser and/or from the user, and/or from other advertisers on the web page such as click-through advertising.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

User Interface

The user interface is provided by a device having a controller, such as a general purpose computer, and a graphical user interface such as a computer screen and a pointing and selecting device such as a touch screen, a mouse, a joystick, etc. From the perspective of a user, the user interface provides a 2-dimensional graphical interface including an image, by which a user can position his mouse or other pointing and selecting device over the image and quickly and easily score the image in two dimensions (qualities) by positioning an on-screen cursor and then entering a single mouse click. The invention may be implemented using any interactive device including a computer communicating over a network such as the Internet or an intranet, a smart phone, a television having a touch screen, and any other of a variety of interactive devices including iPads, iPhones, and interactive devices that have not yet been invented. In the discussion that follows, the invention will be illustrated with respect to an implementation over the Internet, but it will be understood that the invention is not so limited.

Figure 1:
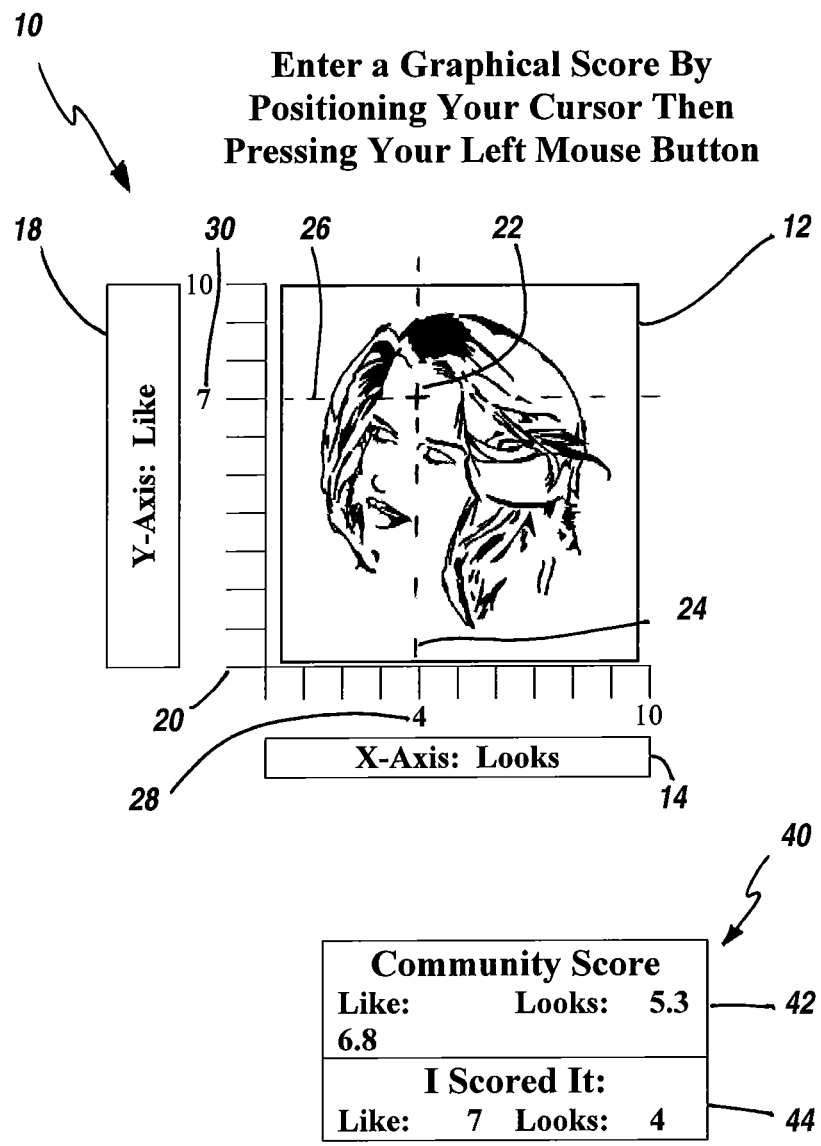
FIG. 1 illustrates an exemplary graphical scoring interface and results presented to a user according to a first embodiment of the invention.

FIG. 1 illustrates an exemplary graphical scoring interface 10 including results presented to an Internet user according to a first embodiment of the invention. The user may go to a particular page on the world wide web where a graphical image 12 is presented to him. The x-axis is marked with a first label 14 and associated numeric scale 16. Similarly, the y-axis is marked with a second label 16 and associated numeric scale 20. In the example, image 12 is of a well known actress, x-axis 14 is labeled "Looks," and the y-axis 18 is labeled "Like." A user then rates the image itself, or an item or concept that is visually represented by the image, based on the two measures presented, by dragging an on-screen cursor, which may be represented by moving crosshairs 22. In the example, the user rates the actress based on how much he likes her as an actress and how much he likes her looks. Using "mouseover" commands which are well known to HTML programmers, as the user navigates around the image, numbers on the x and y axis simultaneously light up, or associated crosshair lines 24 and 26 on the x- and y-axes move, and/or digital numeric readouts 28 and 30 on the x- and y-axes update respectively, to immediately reflect the numeric score associated with the cursor position as the user moves cursor 22. The image on the screen is thus updated simultaneously with the motion to provide an immediate visual numeric feedback to the user corresponding to the location on the image identified by the user. The feedback mechanism thus provides immediate digital numeric feedback corresponding to the position on the image selected by the user, the user having selected the position on the screen by a single user motion such as moving a joystick or mouse. When the user is satisfied that the cursor position represents the score he wishes to assign to the image, the user then selects that position such as by clicking his left mouse button also referred to as "left clicking" If the invention is implemented on a device having a touch activated screen, the user simply touches the screen in the desired location, and thus performs not only the position identification but also the selection action using a single user motion and/or action.

In this example, the user has reached a point on the x/y axes indicating that the User "likes" the image/article at a level of 7 or 70% (30), and likes the looks of the image/article at a level of 4 or 40% (28). The image can be sized to be within the scoring matrix of the x/y axis. The user can score this image anywhere within the matrix of the x/y axis over the image.

In one variation, the image 12 and the labeling 14, 18 for the image have been posted by the website operator. In a second variation, the image 12 has been previously posted by a first user who will be referred to as the "Poster," and who also assigns the x- and y-axis labels 14, 18. Whatever terms the Poster selects for use in the x- and y-axes will be the terms by that will scored by the community of users. The terms to be placed inside in the x- and y-axis labels 14, 18 may be left completely up to the original poster who submits it for the community of users to score. In yet another image, the user assigns the x- and y-axis labels. The axis labels may be selected from a list of common labels, including such terms as "Like," Looks," "Important," "Talent," "Can win the general election," "trust," etc. The invention can be used for product and service marketing and survey purposes, with users rating products and services based on criteria such as "like," "well built," "economical," "customer service," "easy to use," and any other marketing and/or feedback criteria desired.

The invention can be used for political polling. For example, after a presidential primary debate, a screen containing images of all six primary candidates that took part in the debate can be presented to the user, with the user being asked to score each candidate on criteria such as foreign policy, environment, economic plan, electability, trust, and others. The user can quickly input his views using the invention. In this way, the user can provide his views for each of the six different candidates in each of two different categories (e.g., foreign policy and economic plan) merely by dragging and dropping six different cursors on a single web page or other interface screen. After making a first set of scorings, the user could be presented with another screen allowing the user to input scores for each candidate in two additional categories (e.g., trust and electability in the general election) by simply dragging and dropping six additional cursors. The invention therefore presents a fast, efficient, and easy to use interface that is much more likely to be used by the desired targets of the polling, consumer research, etc.

In the embodiment, once the user has scored the image, the website then presents the results to the user in results area 40. In the example, the user's own score is reported in user's score reporting area 44, and the user's score is added to, and averaged with, the scored provided by other members of the community, and those average scores are then presented in community score reporting area 42. In this way the user can see how his own rating of the image compared to other people's ratings for that same image.

Numerous categories of items may be presented to the user to score including politicians, athletes, entertainers, music, books, videos, products, services, initiatives and other proposed laws, etc.

The image presented may either represent the thing being scored, such as an image of a politician, or it may be the thing itself that is being scored. For example, the user may score paintings, music videos, movie trailers, photographs and logos as paintings, music videos, photographs, etc.

The score level range available to the user could be 1-5, or 1-10 as shown in the examples, or 1-100 for finer gradations of scoring, or any other range.

Commercial Offers

Figure 2:
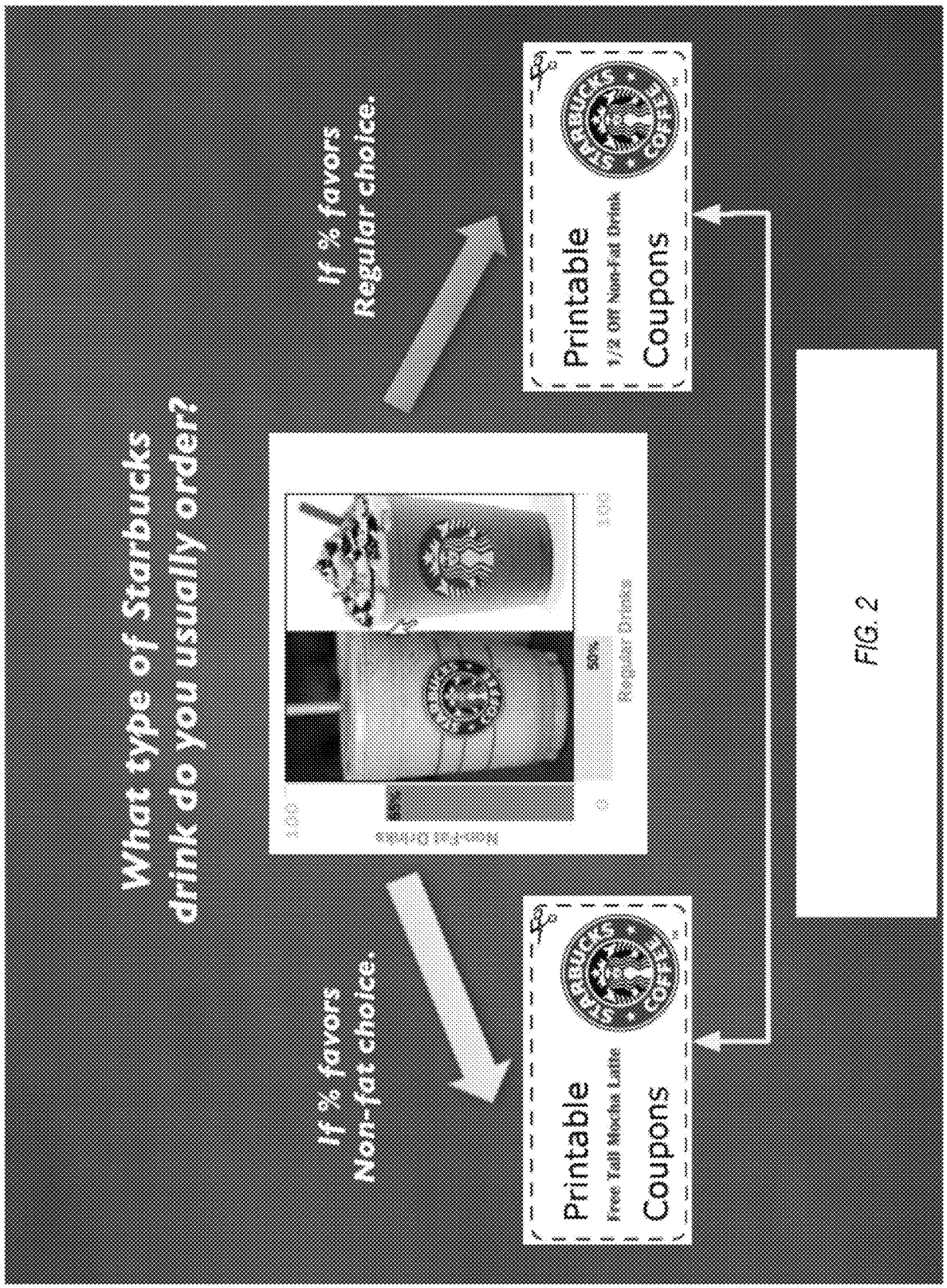
FIG. 2 illustrates a commercial offer than can be presented to the user based upon the scores provided by the user in FIG. 1.

FIG. 2 illustrates a commercial offer than can be presented to the user based upon the scores provided by the user in FIG. 1. In this example, the user had been asked to rate commercial products, and more particularly in this case, the user had been asked whether she likes the regular drinks offered by a popular coffee shop and whether she likes the non-fat drinks offered by that shop. The user selected that she likes the regular drinks at a level of 50 out of 100 or 50%, and that she likes the non-fat drinks at a rate of 85 out of 100 or 85%. Based upon the user's preference and scoring, the user is presented with a commercial offer such as a coupon. A simple algorithm might present to the user a printable coupon for the product which she favored the most. If the user favored non-fat drinks at a higher level than regular drinks, she could be presented with a printable coupon for a non-fat drink; similarly, if she favored regular drinks, she could be presented with a coupon for a regular drink. The image(s) and/or text that comprise the commercial offer, in this case the coupon, can be served up from either the website server or from the advertiser's server.

If the user is using the website from a conventional personal computer with an associated hard printer, the coupon can be a printable coupon sent via HTML, PDF, JPEG, or other methods for sending printable objects. Alternatively, the coupon can be an electronic coupon that can be displayed on a smart phone or other portable electronic device, or transmitted from such a device such as via infrared transmission, and hence can be electronically scanned other otherwise read at a point of sale, point of entry, etc. In this way users who are away from their homes and offices, i.e., who are in the field, can be prompted to go to the website using their portable electronic devices, interact with the website in some way, and can then be sent electronic offers including coupons that can be redeemed in the field.

Figure 3:
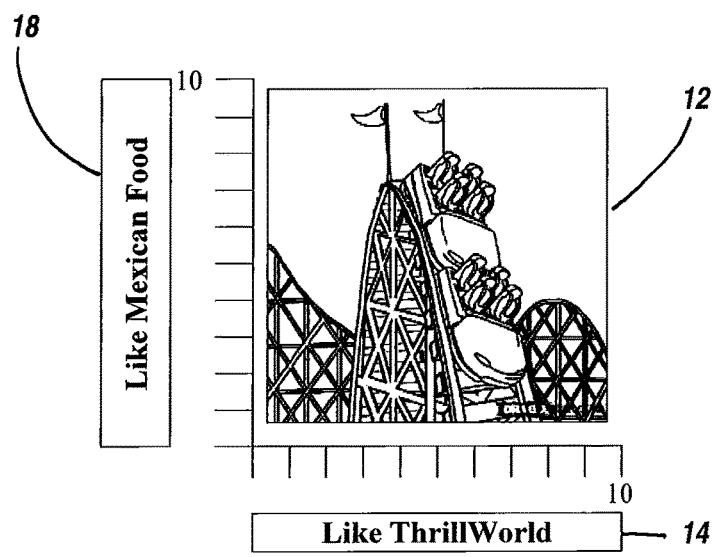
FIG. 3 illustrates additional commercial offers than can be presented to the user based upon the scores provided by the user in FIG. 1.
Figure 3:
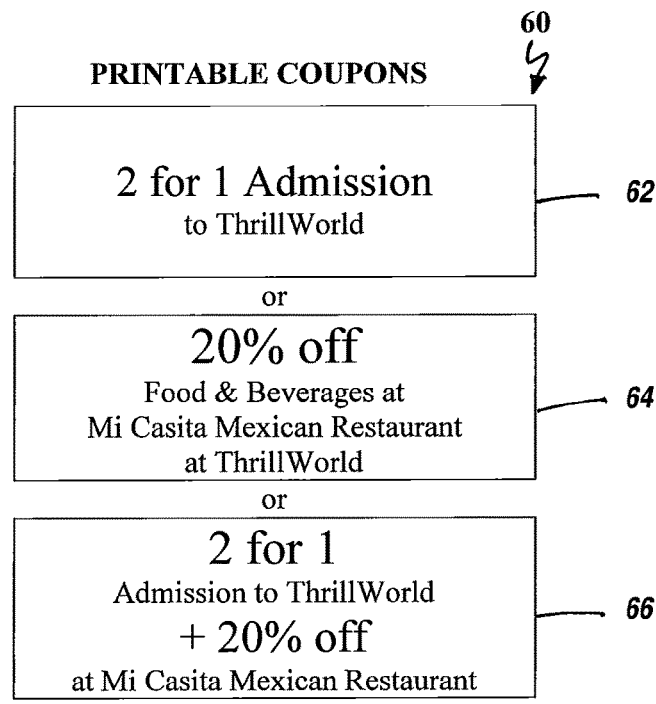

FIG. 3 illustrates additional commercial offers than can be presented to the user based upon the scores provided by the user in FIG. 1. In this example, the image 12 of a theme park called ThrillWorld is presented to the user, and the user is asked rate whether he and/or his family like theme parks in general or ThrillWorld in particular, and whether he and/or his family like Mexican food. Depending on how much the user likes ThrillWorld and how much he likes Mexican food, the user could be presented with one or more coupons 60, such as a coupon 62 good for 2-for-1 admission to Thrill- World, or a coupon 64 good for 20% off at a particular Mexican restaurant in ThrillWorld. Furthermore, the offer could be a package offer, such as coupon 66 that is good for both 2-for-1 admission to ThrillWorld and 20% off at a Mexican restaurant within ThrillWorld. If the user does not like ThrillWorld or does not like Mexican food, the coupon could be for a different theme park or destination, and/or of a different restaurant. In this way, the invention allows a commercial offer such as a coupon to be tailored to a specific user's likes or dislikes, geography, budget, etc.

In another variation, the user can be presented with a commercial offer that represents an optimized offer for his selected multiple criteria. For example, an image could be presented of a healthy meal served at a restaurant, with the x and y axes being labeled "Eat Healthy" and "Price." If the user selects a high value for "Eat Healthy" and a low value for "Price," the user will be presented with a coupon for a healthy dish at a low priced restaurant, or for a low priced restaurant that features a wide variety of healthy meal selections on its menu.

In a further variation, the commercial offer could require some type of immediate payment in exchange for a future benefit such as a future discount. For example, the user could be offered a chance to purchase any one of coupons 62, 64, and/or 66 upon payment of a small fee. In this way, the website operator could obtain revenue both from the advertiser which in this case would be ThrillWorld, from the user, or both.

In another variation, the invention could be used by a user to quickly see how numerous items have been ranked. For example, a single web page could present a gallery having a large number of images presented to a user for scoring. Each image can have a reported score visible on the screen, which could represent the score the user gave that image, or could represent the community score, or both values could be displayed in the gallery view. Mousing over a particular image can cause a window to pop up which allows the user to score that image and/or see the community score.

Once an image 12 or video has been scored, either by the user and/or by the community, the image may be presented with an overlay over the image. The image/video can have other data on or around it such as number of people who have score it, the name of the user who originally started the thread by submitting the image/video/link, how to share with friends on a sharing network, comments, video responses, etc. This allows viewers to quickly identify the real time community score that participants have given the subject within the x/y parameters. The user who originally started the thread can have set whatever words he chose for the x- and y-axis labels. The labels chosen will appear over the image.

The graphical user interface thus defines a graphical 2-for-1 experience. As the user navigates over the image, scores on the x/y axis change simultaneously as the on-screen cursor moves, until the User settles his mouse upon a score he/she chooses. The User can then left-click his mouse to record that 2-dimensional (2-parameter) score.

Programming Details and Examples

As will be appreciated, the invention can be implemented in a variety of different ways, and using various programming languages as desired. Appendix 1 to corresponding provisional patent application Ser. No. 61/414,514 from which priority is claimed and which is incorporated herein by reference, and which is included as an appendix hereto, labeled "1-Click Graphical Polling," provides a graphical illustration of the invention including various options and examples. Appendix 2 to corresponding provisional patent application Ser. No. 61/414,514 from which priority is claimed and which is incorporated herein by reference, and which is included as an appendix hereto, labeled "Graphical Polling Software Code," provides an example of software code that may be used to implement the invention. As will be understood, the Appendix presents one implementation example only, and the functions of the invention may be accomplished using different code and different programming languages from that used in the example. As detailed in Appendix 2, in one implementation the software code performs the steps described in the following paragraphs.

1. An image such as a photograph of a person or a product is uploaded or imported into the website. We will call this the main image. This main image is stored as an article in an MS SQL database, and is assigned a unique ID.

2. The main image can be displayed at any size on the website, as long as it is square in dimension.

Figure 4:
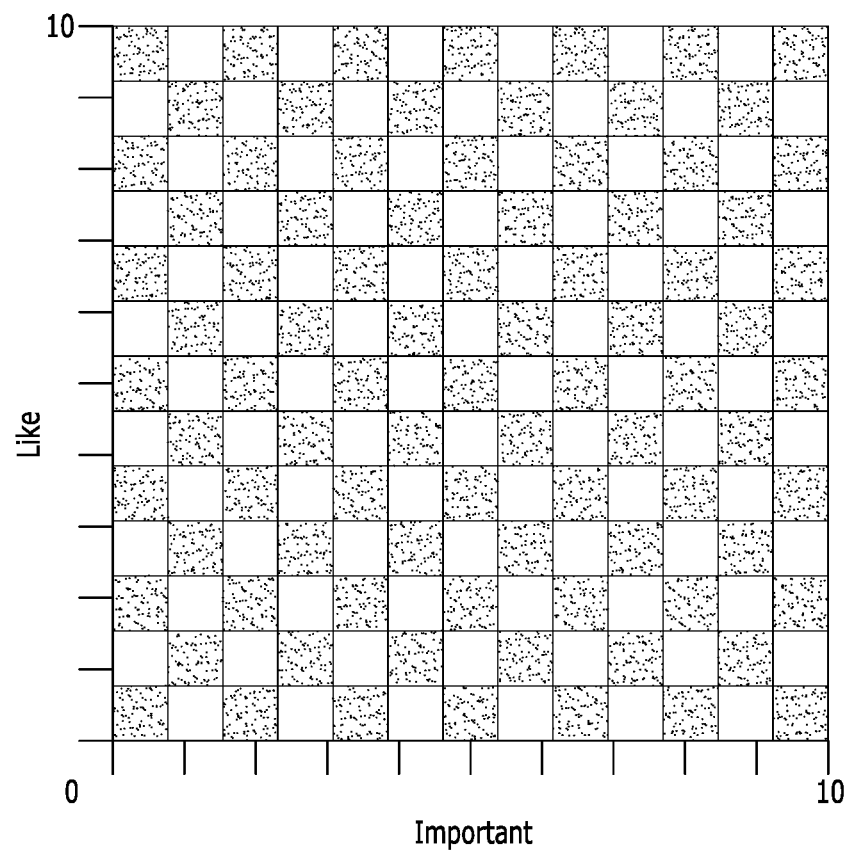

3. Using a <div> layer, another slightly larger image is laid on top of the main image. In other words, a transparent <div> layer is laid on top of the main image. This top layer or image is a transparent.png image named "spacer.png" and is shown in FIG. 4. A background image is also specified on spacer.png using css styles. This background image is "votingoverlay.png". Votingoverlay.png is an image that displays the x/y axis to the left and bottom of the main image.

4. The spacer.png image is laid on top of the main image using css. The following block of ASP code is an example of ASP/CSS code that combines the main image with the scoring axis (spacer.png).

```
response.write "<div style=" "z-index:3000; position:
    absolute;" "><img src=" "/images/spacer.png" "bor-
    der=" "0" "height=" "140" "width=" "140" "style="
    "background-image:url("& imageappurl & imagedir &
    "votingoverlay2.png); background-repeat:no-repeat;"
    "usemap=" "#GradientMap" "></div>" response.write
    "<div style=" "z-index:2910; position:absolute; left:
    30px; top:3px;" ">" response.write "<img src=" " "&
    imageappurl & "memberdata/siteimages/" & feed-
    item_defaultimage_Zone1 & " " "border=" "0"
    "width=" "100" "height=" "100" ">" response.write
    "</div>" response.write "</div>"
```

An imagemap is then applied to the submit.png image. As seen above in the code (usemap="#GradientMap"). The imagemap can be any size as long as it is square in dimension. It is set to the same size as the main image.

For scoring in increments of 10: If the image is 100px×100px, then the image map contains 100, 10px×10px coordinate squares.

For Scoring in increments of 1: If the image is 100px×100px, then the image map contains 1000, 1px×1px coordinate squares.

Each square of the image map has several associated javascript functions that are called on a mouseover effect, or a mouseclick effect. A software code example of one of the coordinate squares on the image map with javascrpipt functions is:

```
<area    shape="rect"    coords="30,1,41,10"
    href="javascript:;;"    onMouseOver="CngTxt('Fi-
    nalScore', 'I Score This: 10'); CngTxt('Txt2', '1');
    CngTxt('Txt3', '10');  CngIcon('xIcon_1', '<img
    src=../images/xnum_1.png width=20 height=20>');
    CngIcon('yIcon_10','<img            src=../images/
    ynum_10.png    width=20    height=20>');"
    onMouseOut="CngTxt('Txt2');    CngTxt('Txt3');
```

CngTxt('FinalScore','I Score This: 0'); CngIcon('yIcon_10'),''; CngIcon('xIcon_1'),''; "onClick="changescore(10, 1, 10, <%=feeditem_id_Zone1%>); CngTxt('Txt5','1'); CngTxt('Txt6','10'); CngTxt('FinalScore2','I Score This: 10'); setHidden('Txt2'); setHidden('Txt3'); setDisplayHidden('FinalScore');">

6. Image map mouseover: When a coordinate square on the image map is moused over, a javascript function is called to change information on the page about the scoring being selected. For example, if the top right coordinate square is moused-over on a 100 point scoring chart, the javascript will display the x-axis (like) and y-axis (important) on the page as "Like:100, Important:100". The mouseover will also change the images used on the graph to represent the selected x-y coordinate. The images display numbers inside of circles to represent which coordinate on the graph is being moused-over. A javascript software code example implementing the mouseover function is:

```
<script language="JavaScript" type="text/javascript">
<!--
function CngTxt(id,popup_scoretxt){
var obj=document.getElementById(id);
if (popup_scoretxt){obj.innerHTML=popup_scoretxt;}
else {obj.innerHTML='0';}
}
function CngIcon(id,FinalScore){
var obj=document.getElementById(id);
if (FinalScore){obj.innerHTML=FinalScore;}
else {obj.innerHTML='';}
}
//-->
</script>
```

Image map mouseout: When the mouse is moved out of coordinate squares on the image map, a javascript function is called to hide the coordinate information that was being displayed on the mouseover. A javascript software code example implementing the mouseout function is:

```
<script language="JavaScript" type="text/javascript">
function setVisible(obj)
{
obj=document.getElementById(obj);
obj.style.visibility=(obj.style.visibility='visible')?'hidden':'visible';
}
function setHidden(obj)
{
obj=document.getElementById(obj);
obj.style.visibility='hidden';
}
function setVisibleVisible(obj)
{
obj=document.getElementById(obj);
obj.style.visibility='visible';
}
</script>
```

Image map mouseclick: When a coordinate square on the image map is clicked, a javascript/AJAX function is called to select the score for the site visitor. The click uses javascript to send the selected x coordinate, y coordinate, total score of the two combined (if applicable), and the database ID of the item being scored.

The javascript/AJAX code sends the selected scores to an ASP file named "inc_changescore.asp". This file uses ASP to first query the MSSQL database to determine if a score already exists for the user for the item ID being scored. If a score does exist for this user, it updates the scores table in the database. If a score for this user does not exist, it inserts a new score into the scores table in the database. An example of javascript/AJAX code implementing the mouseclicks function, which change score in real time, is:

```
<script language="javascript">
//alert("Reached");
var xmlHttp
xmlHttp=GetXmlHttpObject( );
if (xmlHttp==null)
{
alert ("Your browser does not support AJAX!");
//return;
}
//the 'whichLink' variable is assigned on the page making
   the request.
var url=" ";
function changescore(score, xscore, yscore, itemid)
{
url="inc_changescore.asp?score="+score+"&xscore="+
   xscore+"&yscore="+yscore+
"&id="+itemid;
url=url+"&sid="+Math.random( );
xmlHttp.onreadystatechange=stateChangedUp;
xmlHttp.open("GET",url,true);
xmlHttp.send(null);
}
function stateChangedUp( )
{
if(xmlHttp.readyState==4)
{
document.getElementById('scored')
   .innerHTML=xmlHttp.responseText;
}
}
function GetXmlHttpObject( )
{
var xmlHttp=null;
try
{
//Firefox, Opera 8.0+, Safari
xmlHttp=new XMLHttpRequest( );
}
catch (e)
{
//Internet Explorer
try
{
xmlHttp=new ActiveXObject("Msxml2.XMLHTTP");
}
catch (e)
{
xmlHttp=new ActiveXObject("Microsoft.XMLHTTP");
}
}
return xmlHttp;
}
</script>
```

Applications

The invention has nearly limitless applications. The invention can be used to allow a number of different Posters/users within an on-line community to upload images for scoring, and other users to score those images.

The invention can be used to allow persons and companies to survey and poll their clients, customers, target audience, etc. Images can be rated on whether the Poster "likes" a person or a video or any other thing, and whether he thinks the person or thing is "important." Users can rate athletes on whether they think the athlete is "talented" and "contributes positively to the team." Posters can rate movies on whether they are "funny," "scary," "would recommend," "best picture of the year," "cinematography," "acting," "sound track," etc. Politicians can be rated on whether they are "honest," "will run the city efficiently," etc. Ballot propositions or other proposed legislation can be rated for "the right idea" "well writtten," "clarity," "financial impact," etc. Users can rate models on the basis of "face" and "body."

As a non-exclusive list, among the things that can be scored using the present invention are politicians; blogs/individual people ratings; technology (computers, phones, gadgets etc.); sports figures; sports including football, basketball, baseball, NASCAR, horse racing, Olympics, track, boxing, skiing, ice skating, softball, boat racing, and sailing; restaurants; fashion, clothing, and shoes; jewelry; characters in video games; accessories, purses, etc.; dating websites; men and women for dating; individual people; movies; television shows; music; video games; traditional board games and card games; movie trailers; commercials; pets; doctors, lawyers, and other service providers, professional or otherwise; art; cars, trucks, motorcycles, boats, and bicycles; celebrities; beauty products, skin care creams, etc.; fitness products; casinos; bicycles, skateboards, and surfboards; jobs; food; education, quizzes, homework, and tests; environment; camping/outdoor gear; books, magazines, and articles; online auctions; websites; articles; furniture, appliances, and homeware; airlines; gas stations; grocery stores; bars/clubs; beverages; and many others.

Devices

The x/y scoring axis can be utilized in numerous devices and networks including on the Internet, in closed intranets, or on client side devices. The scoring results can be public for all in the network to see or closed only to those set in specific groups by the company or end user.

The x/y scoring axis can also be applied to video, in a video overlay or embedded manner whether static or live motion.

The invention can be applied to, and implemented within, numerous types of devices and communication networks and communities, including the following as mere examples: desktop and laptop computers; any mobile device with a visual screen including smart phones; television screens; SMS text messaging, sharing networks such as Facebook, Myspace, and Linkedin; web browsers with image content such as Google search, Google chrome, Firefox, Internet Explorer, and Safari; end user accesses x/y scoring through internet address such as www . . . , or directly via mobile application such as Android or iPhone operating system application; and embedded in other applications including video games or through direct API installation in other applications/partner websites.

Additional Dimensions

The invention is not strictly limited to two dimensions, but could apply to additional dimensions as well. The x/y scoring axis is described herein primarily with reference to a 2-dimensional, 2-axis scoring mechanism. However, the dimensions could be reduced down to 1-axis or go up to 3 or 4 axes surrounding the image. This can also be done in a 3-dimensional manner, with between 1-6 descriptive axes available to be scored.

For example, if a user has a force based input device, such as a mouse button that senses how hard the user is pushing, the User could score the image in a third dimension at the same time as he scores the image in the first two dimensions, with a three-dimensional image on the screen and numerical values being provided to the user in three dimensions instead of merely two.

Still further, the same image could have multiple sets of axes (grids) provided for rating the same image. For example, the user could select an image of a particular professional athlete, and select the first grid and enter scores for "offensive play" and "defensive play," and then select a second grid associated with that same image and enter scores for "like" and "overall contribution." The possibilities are virtually infinite.

Social Network Applications

The present invention can be used to provide a method of connecting people with similar tastes, outlooks on life, desired activities, etc. In one example, an internet dating site or other social networking could provide one or more images for its users to score and, based upon the score selected by a particular user, suggest people for the user to date or otherwise contact who gave similar scores to the image, or use the scores as a compatibility factor to be used in conjunction with other compatibility factors in matching people based on similar likes, dislikes, interests, political views, etc. More particularly, a user who scores a particular movie high in the categories of both "important" or "musical score" could then be presented with images or profiles of other people who although thought that the movie was important and/or had an exceptional musical score, thus giving those people something immediate to talk about as a conversational "ice breaker." "Meet Up" groups could be suggested to a user based on the user's similarity of likes and dislikes of activities or other things that the user has in common with other members of the different possible groups.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention.

Appendix 1

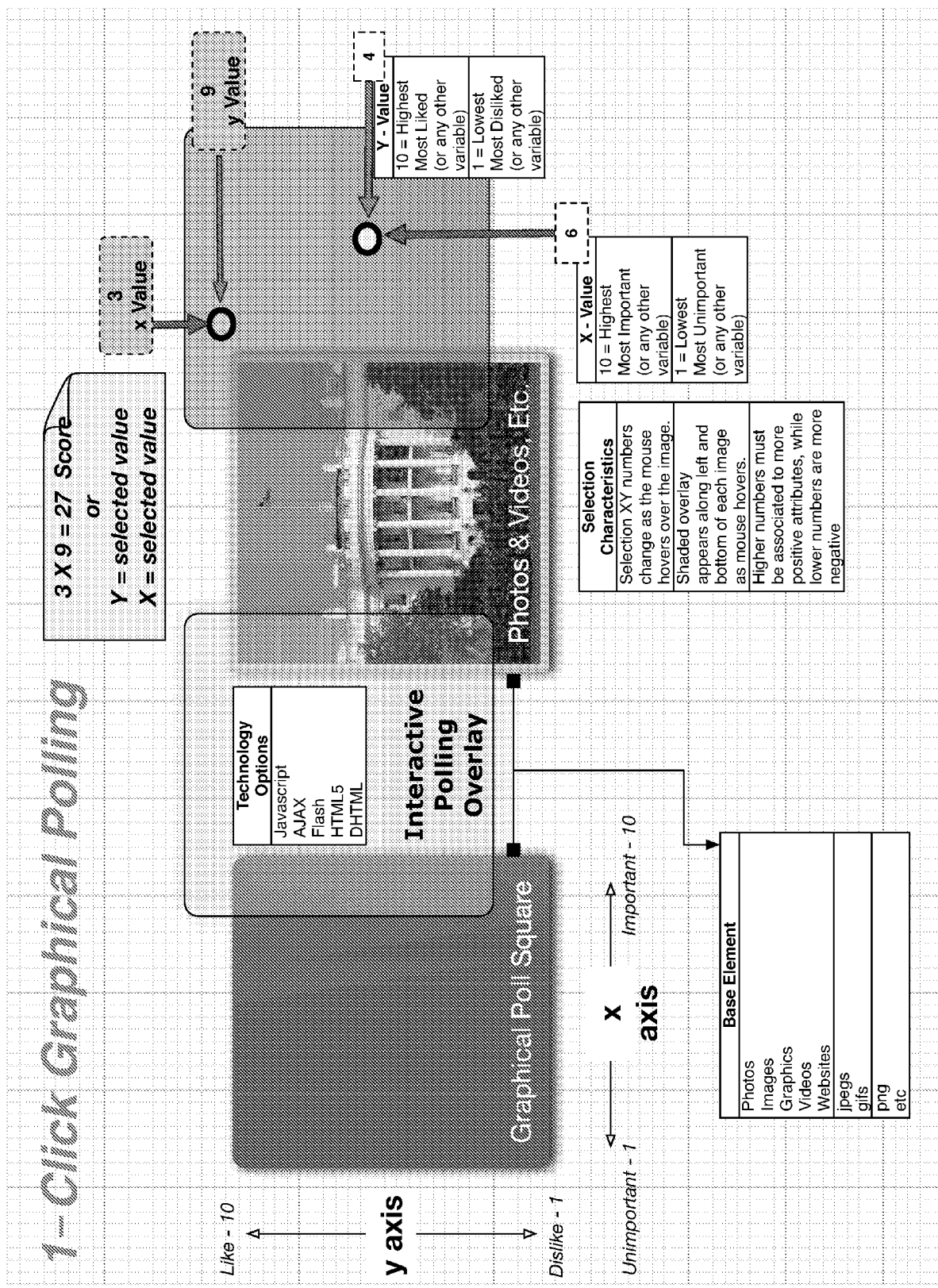

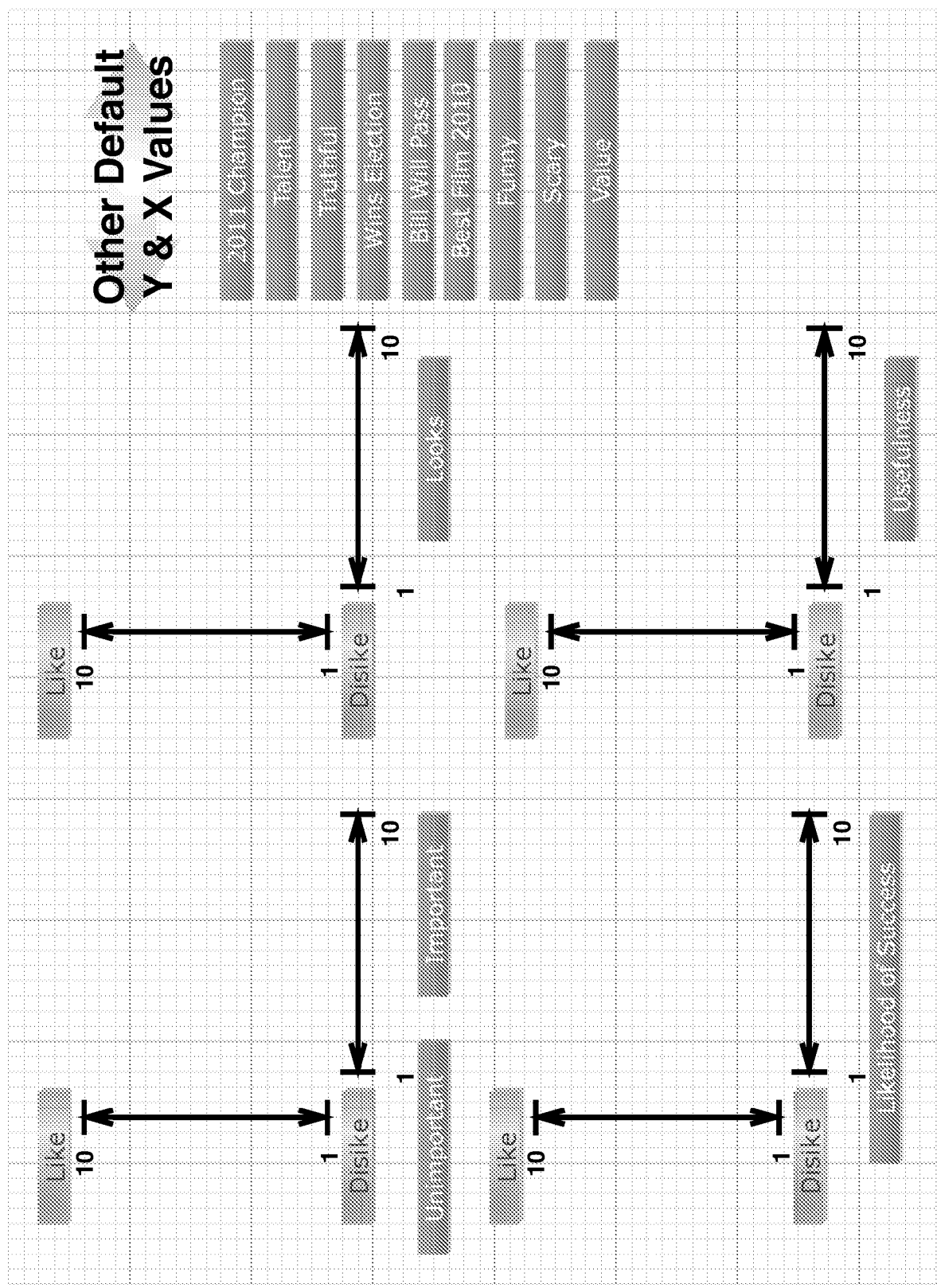

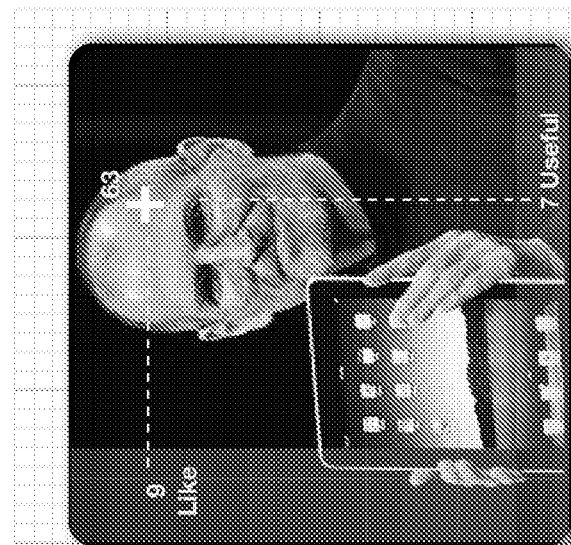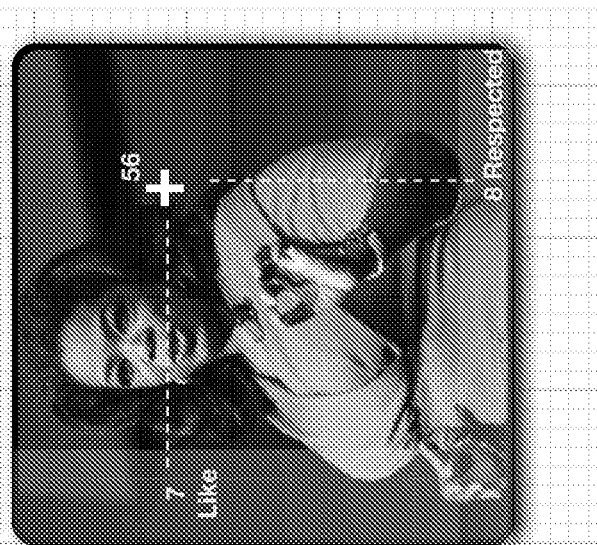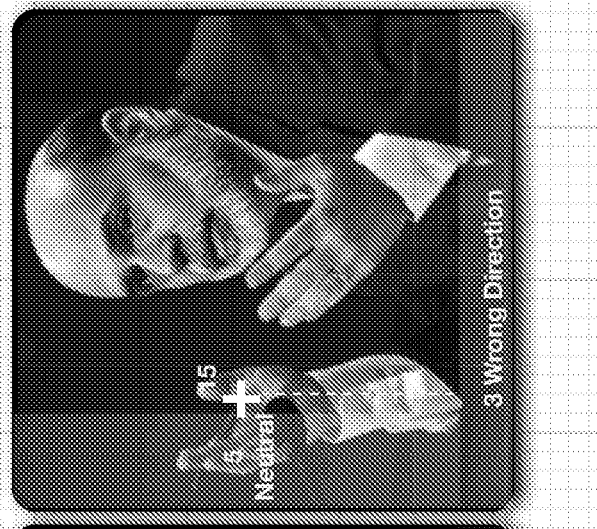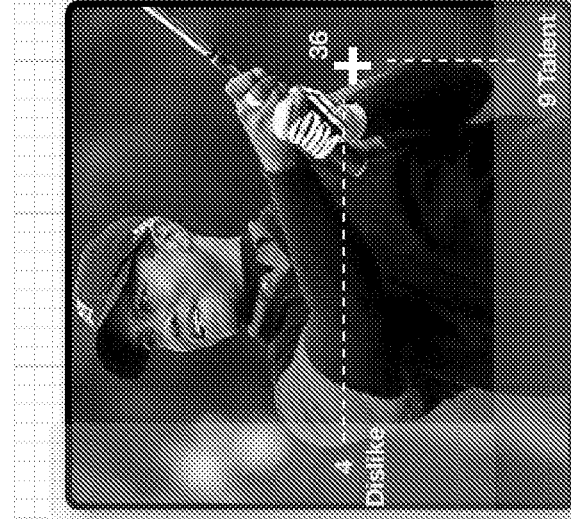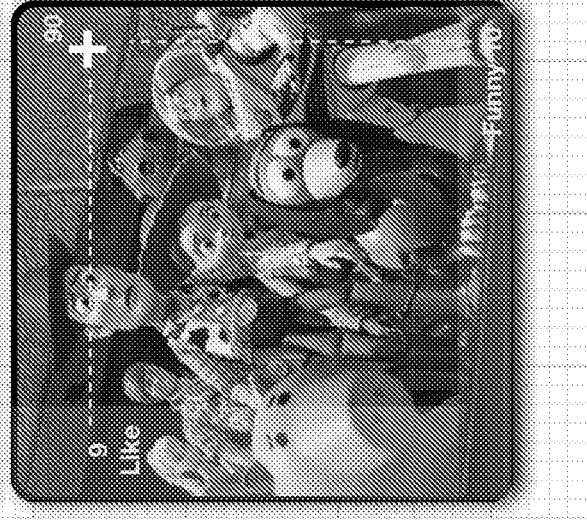

APPENDIX 2

Graphical Polling Software Code

1. An image is uploaded or imported into the website. We will call this the main image. This main image is stored as an article in an MS SQL database, and is assigned a unique ID.

2. The main image can be displayed at any size on the website, as long as it is square in dimension.

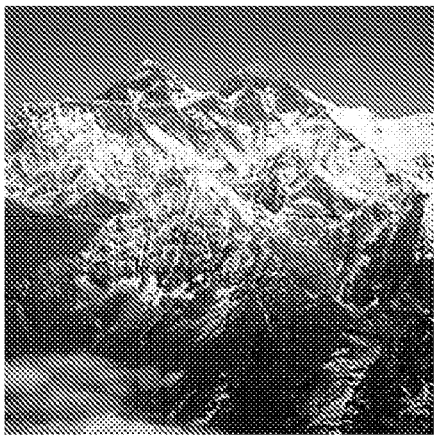

Example: Main Image

3. Using a <div> layer, another slightly larger image is laid on top of the main image. This top layer image is a transparent .png image named "spacer.png. A background image is also specified on spacer.png using css styles. This background image is "votingoverlay.png". Votingoverlay.png is an image that displays the x/y axis to the left and bottom of the main image.

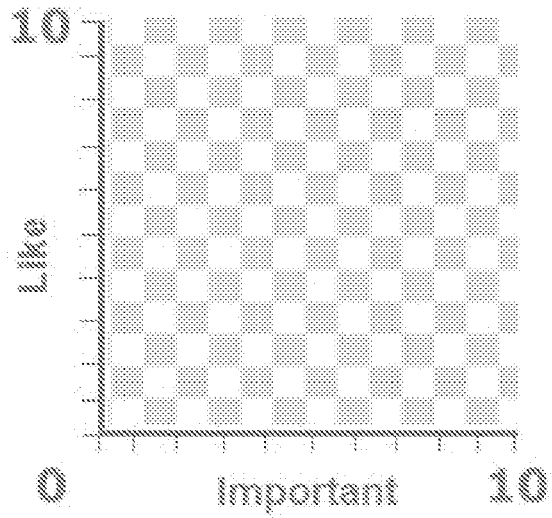

Example: Spacer.png

4. The spacer.png image is laid on top of the main image using css. Specified in the following block of ASP code:

```
response.write "<div style=""z-index:3000; position:absolute;""><img
src=""/images/spacer.png"" border=""0"" height=""140"" width=""140""
style=""background-image:url(" & imageappurl & imagedir & "votingoverlay2.png);
background-repeat:no-repeat;"" usemap=""#GradientMap""></div>"

response.write "<div style=""z-index:2910; position:absolute; left:30px; top:3px;"">"

response.write "<img src=""" & imageappurl & "memberdata/siteimages/" &
feeditem_defaultimage_Zone1 & """ border=""0"" width=""100"" height=""100"">"

response.write "</div>"
response.write "</div>"
```

Example: ASP/CSS code to combine main image with scoring axis (spacer.png)

5. An imagemap is then applied to the submit.png image. As seen above in the code (usemap="#GradientMap"). The imagemap can be any size as long as it is square in dimension. It is set to the same size as the main image.

For scoring in increments of 10: If the image is 100px X 100px, then the image map contains 100, 10px X 10px coordinate squares.

For Scoring in increments of 1: If the image is 100px X 100px, then the image map contains 1000, 1px X 1px coordinate squares.

Each square of the image map has several associated javascript functions that are called on a mouseover effect, or a mouseclick effect.

```
<area shape="rect" coords="30,1,41,10" href="javascript:;;"
onMouseOver="CngTxt('FinalScore','I Score This:  10'); CngTxt('Txt2','1');
CngTxt('Txt3','10'); CngIcon('xIcon_1','<img src=../images/xnum_1.png width=20
height=20>'); CngIcon('yIcon_10','<img src=../images/ynum_10.png width=20
height=20>');" onMouseOut="CngTxt('Txt2'); CngTxt('Txt3'); CngTxt('FinalScore','I
Score This:  0'); CngIcon('yIcon_10'),''; CngIcon('xIcon_1'),''; "
onClick="changescore(10, 1, 10, <%=feeditem_id_Zone1%>); CngTxt('Txt5','1');
CngTxt('Txt6','10'); CngTxt('FinalScore2', 'I Score This:  10'); setHidden('Txt2');
setHidden('Txt3'); setDisplayHidden('FinalScore');">
```

Example: One of the coordinate squares on the image map with javascript functions 6. Image map mouseover: When a coordinate square on the image map is moused over, a javascript function is called to change information on the page about the scoring being selected. For example, if the top right coordinate square is moused-over on a 100 point scoring chart, the javascript will display the x-axis(like) and y-axis(important) on the page as "Like:100, Important:100". The mouseover will also change the images used on the graph to represent the selected x-y coordinate. The images display numbers inside of circles to represent which coordinate on the graph is being moused-over.

```
<script language="JavaScript" type="text/javascript">
<!--
function CngTxt(id,popup_scoretxt){
 var obj=document.getElementById(id);
 if (popup_scoretxt){ obj.innerHTML=popup_scoretxt; }
 else {  obj.innerHTML='0'; }
}
function CngIcon(id,FinalScore){
 var obj=document.getElementById(id);
 if (FinalScore){ obj.innerHTML=FinalScore; }
 else {  obj.innerHTML=''; }
}
//-->
</script>
```

Example: Javascript mouseover code

Image map mouseout: When the mouse is moved out of coordinate squares on the image map, a javascript function is called to hide the coordinate information that was being displayed on the mouseover.

```
<script language="JavaScript" type="text/javascript">
function setVisible(obj)
{
        obj = document.getElementById(obj);
        obj.style.visibility = (obj.style.visibility == 'visible') ? 'hidden' : 'visible';
} function setHidden(obj)
{
        obj = document.getElementById(obj);
        obj.style.visibility = 'hidden';
} function setVisibleVisible(obj)
{
        obj = document.getElementById(obj);
        obj.style.visibility = 'visible';
}
</script>
```

Example: Javascript mouseout code

Image map mouseclick: When a coordinate square on the image map is clicked, a javascript/AJAX function is called to select the score for the site visitor. The click uses javascript to send the selected x coordinate, y coordinate, total score of the two combined (if applicable), and the database ID of the item being scored.

```
<script language="javascript">
        //alert("Reached");
        var xmlHttp xmlHttp=GetXmlHttpObject();
        if (xmlHttp==null)
          {
          alert ("Your browser does not support AJAX!");
        //  return;
          }

//the 'whichLink' variable is assigned on the page making the request.
        var url="";

function changescore(score, xscore, yscore, itemid)
        {
                url="inc_changescore.asp?score=" + score + "&xscore=" + xscore + "&yscore=" + yscore + "&id=" + itemid;
                url=url+"&sid="+Math.random();
                xmlHttp.onreadystatechange=stateChangedUp;
                xmlHttp.open("GET",url,true);
                xmlHttp.send(null);

} function stateChangedUp()
        { if (xmlHttp.readyState==4)
           {
              document.getElementById('scored').innerHTML=xmlHttp.responseText;
           }
        }
        function GetXmlHttpObject()
        {
        var xmlHttp=null;
        try
         {
         // Firefox, Opera 8.0+, Safari
         xmlHttp=new XMLHttpRequest();
         }
        catch (e)
         {
         // Internet Explorer
         try
          {
          xmlHttp=new ActiveXObject("Msxml2.XMLHTTP");
          }
         catch (e)
          {
          xmlHttp=new ActiveXObject("Microsoft.XMLHTTP");
          }
         }
        return xmlHttp;
        }
</script>
```

Example: Javascript/AJAX code for mouseclick. Changes score in real time

7. The javascript/AJAX code send the selected scores to an asp file named "inc_changescore.asp". This file uses ASP to first query the MSSQL database to determine if a score already exists for the user for the item ID being scored. If a score does exist for this user, it updates the scores table in the database. If a score for this user does not exist, it inserts a new score into the scores table in the database.

We claim:

1. A method of displaying an electronic polling request on a graphical user interface and receiving scoring information from a user, the method comprising:

providing a graphical interface to a user, the graphical interface including an image, a first label associated with a first dimension of the image, and a second label associated with a second dimension of the image;

determining a size of the image;

laying a transparent <div> layer over the image, a size of the div layer being based on a size of the image, the <div> layer being sufficiently transparent to allow the user to view the image therethrough, the <div> layer acting as an image map of the image;

when a user selects a location on the image by a selection action, using the image map to obtain x- and v-axis coordinates of the location selected by the user; and simultaneously with the user selecting the location, displaying to the user the coordinates of the selected location;

wherein the user interface allows the user to identify a two-dimensional location on the image using a single user motion, the image being updated simultaneously with the motion to provide an immediate visual numerical feedback to the user corresponding to said location on the image;

the user interface further allowing the user to select the two-dimensional location on the image using a single user selection action;

wherein the two-dimensional location selected by the user corresponds to the user's subjective evaluation in two different criteria of at least one of the image itself and something represented by the image, the two different criteria corresponding to the first label associated with the first dimension of the image and the second label associated with the second dimension of the image.

2. The method of claim 1 further comprising dimensioning the <div> layer image to be slightly larger than the image, the <div> layer containing visible x- and y-axes and respective x- and y-axis labels on an area that is adjacent to but not overlapping the image such that the x- and y-axes and the x- and y-axis labels appear adjacent to the image and not on the image; and juxtaposing a grid of elements with the first image, the grid of elements being sufficiently transparent to allow the user to view the image therethrough, individual elements of the grid corresponding to individual coordinate locations within the image;

wherein the step of displaying to the user the coordinates of the location selected by the user comprises displaying to the user in real time the coordinates of a selected grid element.

3. The method of claim 1 wherein the <div> layer contains visible axis labels.

4. A method of displaying an electronic polling request on a graphical user interface and of receiving scoring information from user, the method comprising:

displaying an image to a user;

laying a <div> layer of hypertext markup language over the image, the <div> layer acting as an image map of the image and defining coordinates of the image;

determining coordinates of the image as selected by the user using a graphical input device by retrieving coordinates of the <div> layer; and displaying in real time the coordinates selected by the user, thereby providing instantaneous visual feedback to a user in at least two dimensions in response to the user manipulating a user input device in at least two corresponding dimensions, the user interface allowing the user to select a two-dimensional scoring input by a single action.

5. The method of claim 4, further comprising a score aggregator that aggregates the scores input from a number of different users and wherein the user interface displays the averages of those scores to the user.

6. A method of displaying an electronic polling request on a graphical user interface and receiving scoring information comprising:

receiving an image from a user;

providing a graphical interface to a user, the graphical interface including the image, a first label associated with a first dimension of the first image, and a second label associated with a second dimension of the first image;

juxtaposing a partially transparent layer with the first image, the partially transparent layer being larger than the image and being sufficiently transparent in an area that corresponds to the image to allow the user to view the image therethrough, the partially transparent layer containing visible x- and y-axes and respective x- and y-axis labels on an area that is adjacent to but not overlapping the image such that the x- and y-axes and the x- and y-axis labels appear adjacent to the image and not on the first image; and juxtaposing a grid of elements with the image, individual elements thereof corresponding to individual coordinate locations within the image;

when a location on the image is selected by the user by a selection action, displaying to the user in real time the coordinates of the grid element that correspond to the selected location;

wherein the user interface allows the user to identify a two-dimensional location on the image using a single user motion, the image being updated simultaneously with the motion to provide an immediate visual numerical feedback to the user corresponding to said location on the image; and wherein the two-dimensional location selected by the user corresponds to the user's subjective evaluation in two different criteria of at least one of the first image itself and something represented by the first image, the two different criteria corresponding to the first label associated with the first dimension of the first image and the second label associated with the second dimension of the first image.

* * * * *